No. 884,319. PATENTED APR. 7, 1908.
G. W. DARNELL.
INSECT DESTROYER.
APPLICATION FILED DEC. 18, 1907.
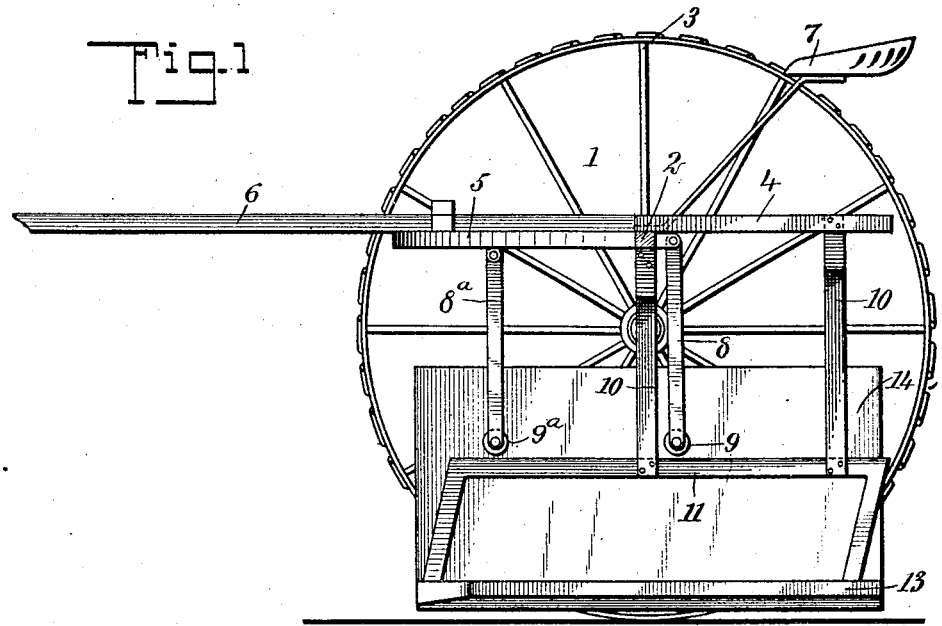
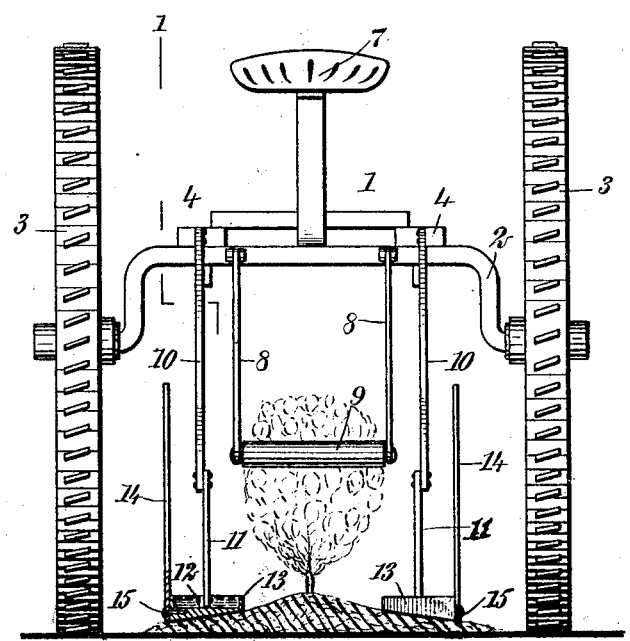
WITNESSES
J. A. Brophy
John K. Brachvogel
INVENTOR
George W. Darnell
BY Munn & Co
ATTORNEYS

UNITED STATES PATENT OFFICE.

GEORGE W. DARNELL, OF NEAR EDNA, TEXAS.

INSECT-DESTROYER.

No. 884,319.

Specification of Letters Patent.

Patented April 7, 1908.

Application filed December 18, 1907. Serial No. 407,004.

*To all whom it may concern:*

Be it known that I, GEORGE W. DARNELL, a citizen of the United States, and a resident near Edna, in the county of Jackson and State of Texas, have invented a new and Improved Insect-Destroyer, of which the following is a full, clear, and exact description.

This invention relates to insect destroyers, and more particularly to devices of this character intended for the destruction of boll weevils and the like.

An object of the invention is to provide a simple, strong and efficient insect destroyer, by means of which the insects can be removed from vegetation and destroyed, and which does not interfere with the ordinary cultivation of the vegetation and does not injure the same in any way.

A further object of the invention is to provide a device of the class described which can be operated in a field of growing vegetation, which removes the insects from the vegetation and destroys the insects removed as well as the insects upon the ground or in bolls or pods which have fallen from the vegetation.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which Figure 1 is a longitudinal section of the insect destroyer on the line 1—1 of Fig. 2; Fig. 2 is a rear elevation of the device showing a part in cross-section; and Fig. 3 is a plan view of a detail.

Before proceeding to a more detailed explanation of my invention, it should be understood that the same is particularly useful in freeing cotton plants from boll weevils, though it can be advantageously used in connection with plants of different kinds, in order to free the same from insects. It is of course important not only to remove insects from the vegetation, but as well to destroy the embryos or germs of the insects before they reach maturity. My insect destroyer is simple in operation and in no way tends to injure the growing vegetation or to interfere with the ordinary cultivation of the same. The device agitates the vegetation in such a manner that the insects thereupon are shaken loose and fall into proper receptacles filled with a destroying agent such as kerosene or black oil. It will be understood that any other material suitable for the purpose can be employed with equal success. At the same time, parts of the device in sliding upon the ground underneath the plants crush the bolls or pods which have fallen from the vegetation, and thereby destroy the growing germs of insects within the bolls or pods.

Referring more particularly to the drawings, I provide a wheeled frame 1 having a transverse axle 2 upon which are journaled the supporting wheels 3. The axle between the wheels is upwardly offset and has rearwardly projecting carriers 4. A yoke 5 is secured to the axle and extends from the same in a forward direction. The frame has shafts 6 by means of which a draft animal can be attached thereto, and a seat 7 for the operator. It will be understood that the insect destroyer can be propelled in any suitable manner, and that the details of construction of the wheeled frame can be altered to suit convenience or individual preference. The extremities of the yoke 5 extend rearwardly beyond the axle and have pivoted thereto hangers 8, between which is revolubly arranged a roller 9. The sides of the yoke at the front of the axle carry similar hangers $8^a$, between which is revolubly arranged a similar roller $9^a$. The rollers depend from the frame at a suitable height above the ground, for a purpose which will appear hereinafter. Each of the carriers 4 has a pair of depending supports 10, which are secured to the top of a pan carrier 11, preferably of an inverted U-form. The ends of the sides of each carrier 11 are mounted at projections 12 of a pan 13, serving to contain the destructive agent such as kerosene or black oil. The pans 13 are arranged at both sides of the rollers 9, $9^a$, and have the forward ends outwardly tapered as is shown most clearly in Fig. 3. The bottoms of the pans are inclined upwardly toward the center of the device, to permit the pans to slide along the ground at the sides of earth rows upon which the vegetation grows, as is shown most clearly in Fig. 2. At the outer longitudinal edges the pans have substantially upright walls or partitions 14, securely mounted in position by means of screws or bolts 15.

The insect destroyer is operated by propelling it along the rows of vegetation so that a pan 13 travels along the ground at each side of the plants. The rollers 9 come into contact with the plants and agitate the same, thereby causing the insects to fall from the plants and to be caught, to a large extent, by the pans 13. These are filled with kerosene, black oil or the like, and the insects which come in contact with the liquid are speedily killed. The walls 14 serve to prevent the escape of the insects in an outward direction, and cause the same to fall into the pans. As the latter slide along the ground, they crush the bolls or seed pods lying thereupon and thus destroy the embryos or germs of the insects.

My invention is particularly applicable to the clearing of cotton plants from boll weevils, as these insects easily fall from the plants when the latter are agitated in a manner other than that due to the wind.

Having thus described my invention, I claim as new and desire to secure by Letters Patent:—

1. An insect destroyer, comprising a frame adapted to be propelled along the ground, means for agitating vegetation, and pans mounted under said means and arranged to slide upon the ground to crush insects, seed pods, bolls and the like, said pans having the bottoms inclined from one edge to the opposite edge, and being adapted to contain an insect destroying substance.

2. An insect destroyer, comprising a frame adapted to be propelled along the ground, means for agitating vegetation, and pans supported by said frame and having the forward ends outwardly tapered, said pans having the bottoms inclined upward toward the inner edges and being adapted to contain an insect destroying substance.

3. An insect destroyer, comprising wheeled frame, hangers depending from said frame and having means for agitating vegetation, and pans carried by said hangers and adapted to contain an insect destroying substance, said pans being arranged to slide along the ground and having at the outer edges, walls extending upwardly to a point above said agitating means, said pans having the bottoms inclined upwardly toward the adjacent edges.

4. An insect destroyer, comprising a wheeled frame, members depending therefrom and serving to agitate vegetation, and pans supported by said frame and having the forward ends outwardly tapered, said pans being adapted to contain an insect-destroying substance and having the bottoms inclined upwardly toward the inner edges, said pans further having at the outer edges walls extending upwardly to a point higher than the agitating members.

In testimony whereof I have signed my name to this specification in the presence of two subscribing witnesses.

GEORGE W. DARNELL.

Witnesses:
T. S. MAURITZ,
P. MAURITZ.